UNITED STATES PATENT OFFICE.

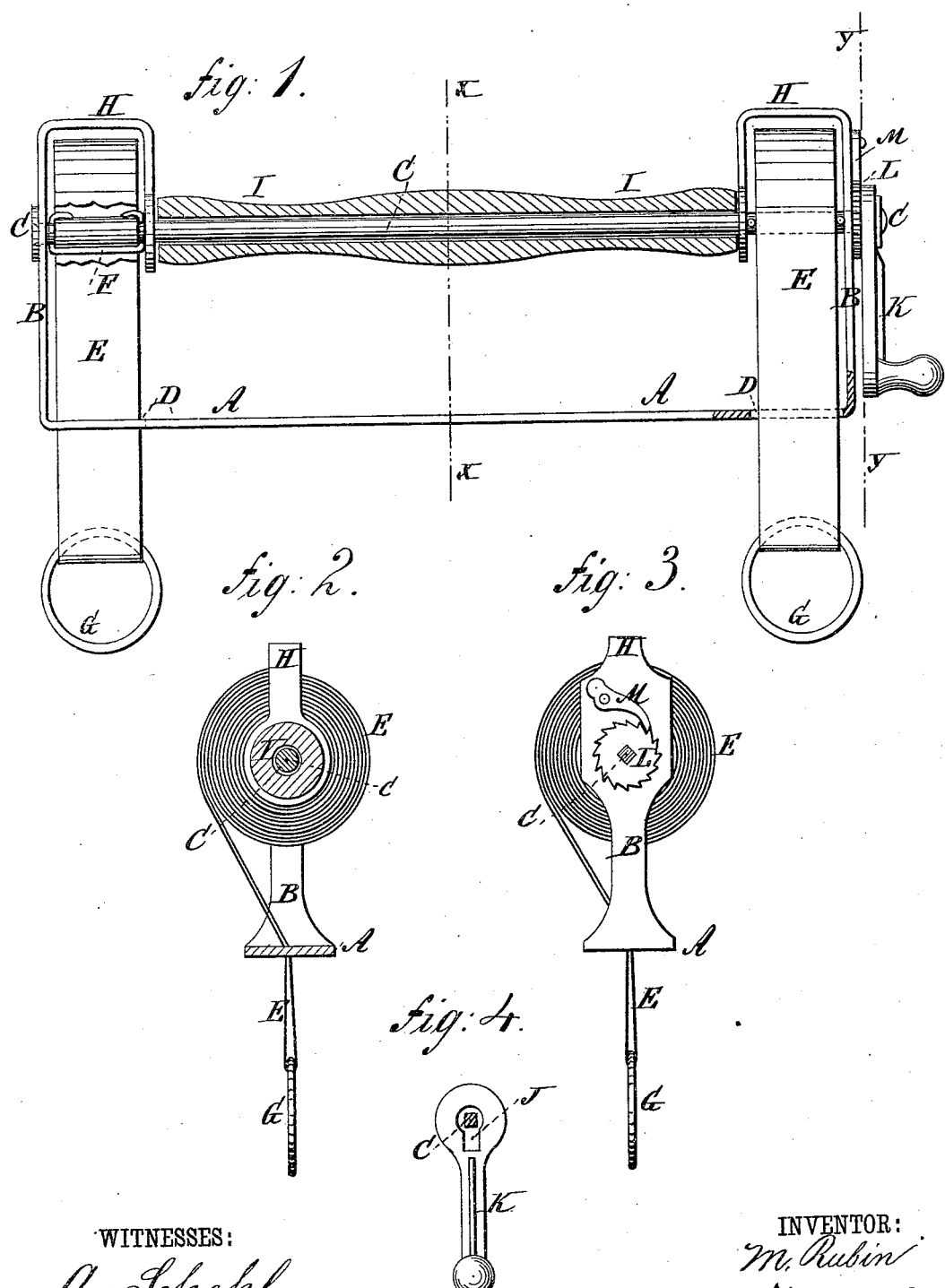

MAX RUBIN, OF NEW YORK, N. Y.

SHAWL-STRAP.

SPECIFICATION forming part of Letters Patent No. 238,440, dated March 1, 1881.

Application filed December 17, 1880. (No model.)

*To all whom it may concern:*

Be it known that I, MAX RUBIN, of the city, county, and State of New York, have invented a new and useful Improvement in Shawl-Straps, of which the following is a specification.

Figure 1 is a sectional side elevation of the improvement. Fig. 2 is a sectional end elevation taken through the line $x\,x$, Fig. 1. Fig. 3 is a sectional end elevation taken through the line $y\,y$, Fig. 1; and Fig. 4 represents the crank, the rod being shown in cross-section.

Similar letters of reference indicate corresponding parts.

This invention relates to that class of shawl-straps in which the straps are wound around a rod to clasp the package, and has for its object to simplify the construction and lessen the cost of manufacture.

The invention consists in constructing a shawl-strap handle of a bar having its end parts bent upward to form standards to receive the rod that carries the binding-straps, guards to keep the coiled straps in place, a handle attached to the rotary rod, a crank having a slot enlarged at one end to receive the square end of the rotary rod, and the ratchet-wheel and pawl for locking the rotary rod in place; also, in the combination of the crank, having a slot enlarged at one end, with the square end of the rod that carries the binding-straps, so that the crank can be made to rotate the rod or allowed to turn freely; also, in the combination, with the standards and the rotary rod, of guards to keep the coiled straps in place, as will be hereinafter fully described.

A represents a bar of suitable length and breadth, and which has its end parts bent upward at right angles to serve as standards B to support the rod C. The bar A has slots D formed in it near the standards B, to receive the straps E. The ends of the straps E, after being passed through the slots D, are brought together, passed around the rod C, and secured to the said rod by a staple-shaped wire, F, the arms of which are passed through holes in the said rod C, and are bent down upon the said straps E.

Upon the middle part or loop of each strap E is placed a ring, G, of a diameter greater than the length of the slots D, to prevent the loops of the straps from being drawn through the said slots.

The standards B project above the rod C, are bent over into U shape, and have holes in their ends to receive the said rod C, to form guards H to keep the straps E in place when wound upon the rod C.

Upon the rod C, between the guards H, is placed a handle, I, of wood, leather, or other suitable material, so that the handle may be brought down close to the bar A, that rests upon the package. The handle I revolves or is loose upon the rod C, so that it can be held stationary while the said rod C is turned in the handle by a crank to wind up and unwind the straps.

One end of the rod C projects beyond the standard B, and is made square to enter a slot, J, in the crank farthest from K. The end of the slot J farthest from the handle of the crank K is enlarged into circular form, as shown in Fig. 4. With this construction, when the crank K is adjusted to bring the narrow part of the slot J upon the rod C the said rod will be turned by turning the said crank, and when the crank K is adjusted to bring the enlarged part of the slot J upon the rod C the said crank can be turned without turning the said rod, so that, whatever be the position of the crank K when the straps E have been wound up to clasp the package with the requisite firmness, the said crank K can be allowed to swing down parallel with the standard B, so as to be out of the way.

To the rod C, between the standards B and the crank K, is secured a ratchet-wheel, L, with the teeth of which engages a pawl, M, pivoted to the guard H, to lock the rod C in place when the straps E have been wound up.

Having thus described my invention, I claim as new and desire to secure by Letters Patent—

1. A shawl-strap handle consisting of the bar A, having its ends bent upward to form standards B, the rod C, carrying straps E, the guards H, the handle I, the crank K, having slot J, enlarged at one end, and the ratchet and pawl L M, as shown and described.

2. In a shawl-strap handle, the crank K, having slot J, enlarged at one end, in combination with the square end of the rod C, carrying the strap E, whereby the crank can be made to rotate the rod or allowed to turn freely, as described.

3. In a shawl-strap handle, the combination, with the standards B and rod C, of the guards H, whereby the coils of the straps E are kept in place, as described.

4. In a shawl-strap handle, the combination, with the standards B B, provided with guards H, of the rod C, journaled therein, and the handle I, arranged loosely on the said rod, whereby the handle I may be held while the rod is rotated within it, for the purpose of winding up the straps E, as described.

MAX RUBIN.

Witnesses:
JAMES T. GRAHAM,
C. SEDGWICK.